US 7,778,474 B2

(12) United States Patent
Bandou et al.

(10) Patent No.: US 7,778,474 B2
(45) Date of Patent: Aug. 17, 2010

(54) SCALABLE ENCODING METHOD AND APPARATUS, SCALABLE DECODING METHOD AND APPARATUS, PROGRAMS THEREFOR, AND STORAGE MEDIA FOR STORING THE PROGRAMS

(75) Inventors: Yukihiro Bandou, Yokosuka (JP); Seishi Takamura, Yokosuka (JP); Yoshiyuki Yashima, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 980 days.

(21) Appl. No.: 11/578,277

(22) PCT Filed: Oct. 4, 2005

(86) PCT No.: PCT/JP2005/018329

§ 371 (c)(1),
(2), (4) Date: Oct. 11, 2006

(87) PCT Pub. No.: WO2006/038607

PCT Pub. Date: Apr. 13, 2006

(65) Prior Publication Data

US 2007/0242895 A1 Oct. 18, 2007

(30) Foreign Application Priority Data

Oct. 6, 2004 (JP) .............................. 2004-293395

(51) Int. Cl.
*G06K 9/36* (2006.01)
(52) U.S. Cl. ..................................................... 382/232
(58) Field of Classification Search ......... 382/232–233, 382/236, 238–240, 244–250; 375/240.01–240.03, 375/240.11–240.15, 240.18–240.2, 240.25; 348/394.1–395.1, 403.1–404.1, 408.1–416.1, 348/424.2
See application file for complete search history.

(56) References Cited

U.S. PATENT DOCUMENTS

| 6,320,910 | B2 | 11/2001 | Kondo et al. | |
|---|---|---|---|---|
| 6,393,152 | B2 | 5/2002 | Takahashi et al. | |
| 6,639,943 | B1 * | 10/2003 | Radha et al. ........... | 375/240.11 |
| 6,944,346 | B2 * | 9/2005 | Van Der Schaar ........... | 382/236 |
| 2003/0118096 | A1 | 6/2003 | Ishtiaq et al. | |
| 2004/0252897 | A1 | 12/2004 | Hara et al. | |

FOREIGN PATENT DOCUMENTS

JP            05-328293            12/1993

(Continued)

OTHER PUBLICATIONS

Mallat, S. G., "A Theory for Multiresolution Signal Decomposition: The Wavelet Representation", IEEE Trans. Pattern Analysis and Machine Intelligence, vol. 11, No. 7, pp. 674-693, Jul. 1989.

(Continued)

*Primary Examiner*—Jose L Couso
(74) *Attorney, Agent, or Firm*—Harness, Dickey & Pierce, PLC

(57) ABSTRACT

A scalable encoding method for decomposing an image signal into signals assigned to layers so as to encode the image signal includes encoding an image signal of at least one target layer among the layers based on an amount of codes allocated to the target layer; outputting a residual signal of the target layer corresponding to a difference between the pre-encoded image signal and an image signal decoded from the encoded image signal; determining a target amount of codes allocated for encoding the residual signal based on the residual signal, an amount of codes allocated to an objective layer, and an image signal of the objective layer; encoding the residual signal based on the determined target amount of codes; revising the amount of codes allocated to the objective layer based on the target amount of codes; and encoding the image signal of the objective layer based on the revised amount.

8 Claims, 5 Drawing Sheets

FOREIGN PATENT DOCUMENTS

| | | |
|---|---|---|
| JP | 06-078294 A | 3/1994 |
| JP | 09-238081 | 9/1997 |
| JP | 2000-333181 A | 11/2000 |
| JP | 2004-254300 A | 9/2004 |
| TW | 484323 | 4/2002 |
| TW | 548978 | 8/2003 |

OTHER PUBLICATIONS

Ohm, J. R., "Three-Dimensional Subband Coding with Motion Compensation," IEEE Trans. on Image Processing, vol. 3, No. 5, pp. 559-571, Sep. 1994.

Taubman, D. "High Performance Scalable Image Compression with EBCOT", IEEE Trans. on Image Processing, vol. 9, No. 7, pp. 1158-1170, Jul. 2000.

Xu, J. et al., "Three-Dimensional Embedded Subband Coding with Optimized Truncation (3-D ESCOT)", Applied and Computational Harmonic Analysis 10, pp. 290-315, 2001.

Van der Schaar, M. et al (eds.), "Description of Core Experiments in SVC", ISO/IEC JTC 1/SC 29/WG 11 N6373, pp. 1-14, Mar. 2004.

Jayant, N. S. et al, "Digital Coding of Waveforms," pp. 120-121, Prentice Hall, 1984.

Schwarz, H., Marpe, D, Wiegand, T, "SNR-scalable Extension of H.264/AVC", Joint Video Team (JVT) of ISO/IEC MPEG & ITU-T-VCEG (ISO/IEC JTC1/SC29/WG11 and ITU-T-SG16 Q.6), 10th Meeting: Waikoloa, Hawaii, USA, Dec. 8-12, 2003.

Mihaela van der Schaar et al., "A Hybrid Temporal-SNR Fine-Granular Scalability for Internet Video", IEEE Transactions on Circuits and Systems for Video Technology, IEEE Service Center, Piscataway. NJ, US, vol. 11, No. 3, Mar. 2001.

Bandoh, Y., Takamura, S., Yashima, Y., "Proposal of interband bit re-allocation for SVC", ISO/IEC JTC 1/SC 29/WG 11, Document M11235, Oct. 13, 2004, pp. 1-4.

Schwarz, et al., "SNR-scalable Extension of H.264/AVC", Joint Video Team (JVT) of ISO/IEC MPEG & ITU-T VCEG, 10th Meeting: Waikoloa, Hawaii, USA, Dec. 8-12, 2003.

* cited by examiner

| LAYER | WIDTH [pels] | HEIGHT [pels] | FRAME RATE [frames/sec] | AMOUNT OF CODES [Kbits/sec] |
|---|---|---|---|---|
| LEVEL 1 | 176 | 144 | 15 | 96 |
| LEVEL 2 | 176 | 144 | 15 | 192 |
| LEVEL 3 | 352 | 288 | 30 | 384 |
| LEVEL 4 | 352 | 288 | 30 | 750 |
| LEVEL 5 | 704 | 578 | 30 | 1500 |
| LEVEL 6 | 704 | 578 | 60 | 3000 |

SCALABLE ENCODING METHOD AND APPARATUS, SCALABLE DECODING METHOD AND APPARATUS, PROGRAMS THEREFOR, AND STORAGE MEDIA FOR STORING THE PROGRAMS

TECHNICAL FIELD

The present invention relates to a highly efficient image signal encoding/decoding technique, and in particular, relates to an encoding/decoding technique for allocating an optimum amount of codes in scalable encoding.

Priority is claimed on Japanese Patent Application No. 2004-293395, filed Oct. 6, 2004, the content of which is incorporated herein by reference.

BACKGROUND ART

In recent years, scalable encoding has gained attention because it can help to cope with diversified network and terminal environments. In scalable encoding, an image signal is hierarchically decomposed so as to perform encoding for each layer. The following hierarchical decomposition methods are known:
(i) band splitting with respect to spatial frequency, and
(ii) band splitting with respect to temporal frequency.

For type (i), wavelet decomposition (see, for example, Non-Patent Document 1) is a representative example, and for type (ii), motion compensation temporal filtering (MCTF) (see, for example, Non-Patent Document 2) is a representative example.

Additionally, as techniques relating to the encoding of each hierarchical layer, EBCOT (see, for example, Non-Patent Document 3), 3D-ESCOT (see, for example, Non-Patent Document 4), and the like are known.

Non-Patent Document 1: "A theory for multiresolution signal decomposition: the wavelet representation", S. G. Mallat, IEEE Trans. Pattern Analysis and Machine Intelligence, Vol. 11, No. 7, pp. 674-693, July, 1989.

Non-Patent Document 2: "Three-dimensional subband coding with motion compensation", J. R. Ohm, IEEE Trans. on Image Processing, Vol. 3, No. 5, pp. 559-571, September, 1994.

Non-Patent Document 3: "High performance scalable image compression with EBCOT", D. Taubman; IEEE Trans. on Image Processing, Volume: 9, Issue: 7, pp. 1158-1170, July, 2000.

Non-Patent Document 4: "Three-Dimensional Embedded Subband Coding with Optimized Truncation (3-D ESCOT)", J. Xu, Z. Xiong, S. Li, and Y. Zhang, Applied and Computational Harmonic Analysis 10, pp. 290-315, 2001.

Generally, the amount of codes allocated to each layer is determined before encoding, in consideration of the band of the network, or the like.

FIG. 1 shows an example of the layer setting in the scalable encoding in which an image signal, whose number of pixels is based on the 4CIF standard (i.e., 704×576 pixels, 60 frames/sec), is decomposed into six layers (see "Description of Core Experiments in SVC", ISO/IEC JTC 1/SC 29/WG 11 N6373, March, 2004).

When the signal belonging to each layer is independently encoded under the above condition, the image may have fatal degradation in the quality of the image. Regarding an image having a lower layer in which data is concentrated, if a sufficient amount of codes is not allocated to the lower layer, considerable encoding distortion occurs. However, each layer is independently encoded; thus, the degraded lower layer cannot be restored to the former state even by adding data of the higher layer to the data of the lower layer. Therefore, in the case of such an image having the lower layer in which data is concentrated, even when a decoded signal of the higher layer is added to the lower layer, improvement in the quality of the decoded image cannot be expected. Such a problem is caused by the condition such that the amount of codes allocated to each layer is fixed regardless of the type of image, and that the encoding of each layer is independently performed.

DISCLOSURE OF INVENTION

In light of the above circumstances, an object of the present invention is to establish a method for adaptively allocating the amount of codes to each layer in accordance with the difference between the amounts of data of layers, and to provide a technique for improving the quality of the decoded image.

Therefore, the present invention provides a scalable encoding method for decomposing an image signal into signals assigned to a plurality of layers so as to encode the image signal, the method comprising the steps of:

encoding an image signal of at least one target layer among the layers based on an amount of codes allocated to the target layer, and outputting a residual signal of the target layer corresponding to a difference between the pre-encoded image signal and an image signal decoded from the encoded image signal;

determining a target amount of codes allocated for encoding the residual signal based on the residual signal, an amount of codes allocated to an objective layer, and an image signal of the objective layer;

encoding the residual signal based on the determined target amount of codes; and revising the amount of codes allocated to the objective layer based on the target amount of codes and encoding the image signal of the objective layer based on the revised amount of codes.

The scalable encoding method may further comprise the step of:

multiplexing encoded signals of the layers so as to form an encoded stream, wherein:

the residual signal encoded using the target amount of codes may be used as additional data with respect to the already-encoded image signal of the target layer; and the encoded signals to be multiplexed may include the already-encoded image signal of the target layer, the residual signal encoded based on the target amount of codes, and the image signal of the objective layer which has been encoded based on the revised amount of codes.

In a preferable example, the step of determining the target amount of codes includes respectively obtaining encoding distortions of the target layer and the objective layer, and determining an amount of codes which minimizes the sum of the obtained encoding distortions as the target amount of codes.

In accordance with the present invention, regarding an image having a lower layer in which data is concentrated, if a sufficient amount of codes is not allocated to the lower layer, the encoding residual signal of the lower layer is encoded using part of the amount of codes allocated to a higher layer. Under a condition that the amount of codes allocated to the entire signal is fixed, the amount of codes used for encoding the residual signal of the lower layer may be set so as to minimize the sum of encoding distortions. In this case, modeling of the relationship between the amount of codes and the encoding distortions is possible so as to determine an appropriate amount of codes with respect to the encoding residual signal power of the lower layer, based on measurement results of the signal power of each layer and the encoding residual signal power of the lower layer.

In addition, the residual signal, which has been encoded based on the determined target amount of codes, is used as additional data with respect to the already-encoded image signal of the target layer, and scalable encoding is performed by computing a revised amount of codes allocated to the objective layer based on the target amount of codes and the amount of codes originally allocated to the objective layer.

The present invention also provides a scalable encoding apparatus for decomposing an image signal into signals assigned to a plurality of layers so as to encode the image signal, the apparatus comprising:

a target layer encoding part for encoding an image signal of at least one target layer among the layers based on an amount of codes allocated to the target layer, and outputting a residual signal of the target layer corresponding to a difference between the pre-encoded image signal and an image signal decoded from the encoded image signal;

a target code-amount determining part for determining a target amount of codes allocated for encoding the residual signal based on the residual signal, an amount of codes allocated to an objective layer, and an image signal of the objective layer;

a residual signal encoding part for encoding the residual signal based on the determined target amount of codes; and an objective layer encoding part for revising the amount of codes allocated to the objective layer based on the target amount of codes and encoding the image signal of the objective layer based on the revised amount of codes.

The present invention also provides a scalable decoding method for decoding an input encoded stream of an image signal encoded by the above-described scalable encoding method, the decoding method comprising the steps of:

decomposing the encoded stream into encoded streams of already-encoded layer signals of each layer, encoded streams of already-encoded residual signals corresponding to the layer signals, and control data for the signals of each layer;

for each of the first to Nth layers, decoding the encoded stream of the already-encoded layer signal when the input encoded stream includes this encoded stream of the already-encoded layer signal;

for each of the first to Nth layers, decoding the encoded stream of the already-encoded residual signal corresponding to the layer signal when the input encoded stream includes this encoded stream of the already-encoded residual signal; and synthesizing the layer signals and the residual signals, which have been decoded for each layer.

The present invention also provides a scalable decoding apparatus for decoding an input encoded stream of an image signal encoded by the above-described scalable encoding apparatus, the apparatus comprising:

a hierarchical decomposition part for decomposing the encoded stream into encoded streams of already-encoded layer signals of each layer, encoded streams of already-encoded residual signals corresponding to the layer signals, and control data for the signals of each layer;

a layer signal decoding part for decoding, for each of the first to Nth layers, the encoded stream of the already-encoded layer signal when the input encoded stream includes this encoded stream of the already-encoded layer signal;

a residual signal decoding part, for each of the first to Nth layers, for decoding the encoded stream of the already-encoded residual signal corresponding to the layer signal when the input encoded stream includes this encoded stream of the already-encoded residual signal; and a decoded signal synthesizing part for synthesizing the layer signals and the residual signals, which have been decoded for each layer.

The present invention also provides a scalable encoding program for making a computer execute a process of decomposing an image signal into signals assigned to a plurality of layers so as to encode the image signal, the program comprising the steps of:

encoding an image signal of at least one target layer among the layers based on an amount of codes allocated to the target layer, and outputting a residual signal of the target layer corresponding to a difference between the pre-encoded image signal and an image signal decoded from the encoded image signal;

determining a target amount of codes allocated for encoding the residual signal based on the residual signal, an amount of codes allocated to an objective layer, and an image signal of the objective layer;

encoding the residual signal based on the determined target amount of codes; and revising the amount of codes allocated to the objective layer based on the target amount of codes and encoding the image signal of the objective layer based on the revised amount of codes.

The present invention also provides a scalable decoding program for making a computer execute a process of decoding an input encoded stream of an image signal encoded by the above-described scalable encoding method, the decoding method comprising the steps of:

decomposing the encoded stream into encoded streams of already-encoded layer signals of each layer, encoded streams of already-encoded residual signals corresponding to the layer signals, and control data for the signals of each layer;

for each of the first to Nth layers, decoding the encoded stream of the already-encoded layer signal when the input encoded stream includes this encoded stream of the already-encoded layer signal;

for each of the first to Nth layers, decoding the encoded stream of the already-encoded residual signal corresponding to the layer signal when the input encoded stream includes this encoded stream of the already-encoded residual signal; and synthesizing the layer signals and the residual signals, which have been decoded for each layer.

The present invention also provides a computer-readable storage medium storing the above-described scalable encoding program and a computer-readable storage medium storing the above-described scalable decoding program.

In accordance with the present invention, between any adjacent layers after hierarchical decomposition, a lower-layer signal can be decomposed into a basic signal and a residual signal, and a multiplexed encoded stream can be formed using the basic signal, the residual signal, and a higher-layer signal. The decoding apparatus, into which the multiplexed encoded stream is input, can obtain a decoded signal of the lower layer by using the basic signal and the residual signal.

Conventionally, when the signal belonging to each layer is independently encoded, if an image has a lower layer in which data is concentrated and a sufficient amount of codes is not allocated to the lower layer, improvement in the quality of the decoded image cannot be expected even by adding a decoded signal of the higher layer to the lower layer. However, in the present invention, part of the amount of codes allocated to the higher layer can be used for encoding the lower layer in accordance with the amount of data of the lower layer. Therefore, when the total amount of codes is fixed, it is possible to improve the quality of the decoded image obtained by the total amount of codes

BEST MODE FOR CARRYING OUT THE INVENTION

Below, an embodiment in accordance with the present invention will be explained with reference to the drawings.

Figure 3:
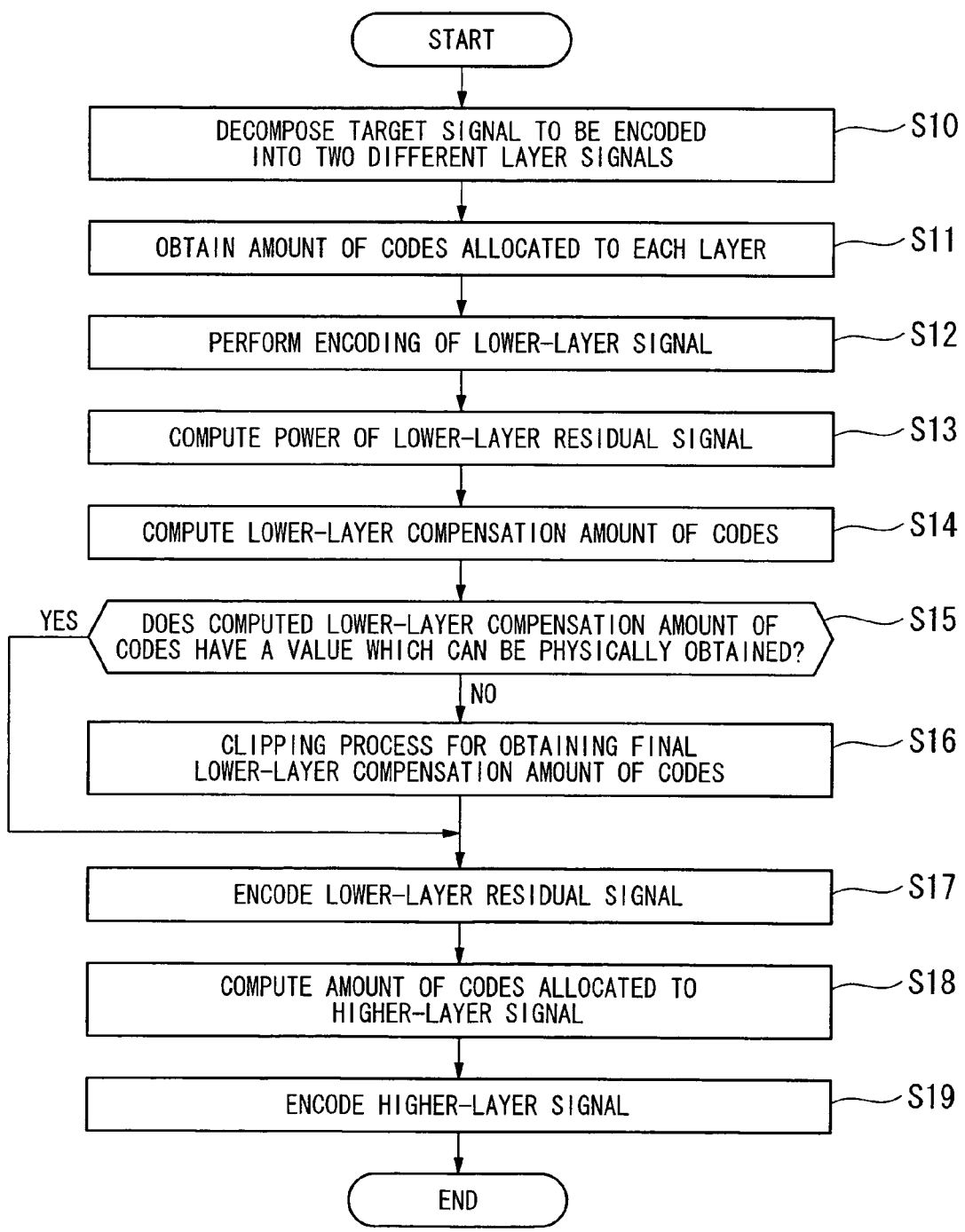
FIG. 3 is a flowchart showing an encoding process in an embodiment.

FIG. 3 is a flowchart showing an encoding process in the present embodiment. In this process, the number of hierarchical layers is 2, $R_l$ indicates the amount of codes allocated to the lower-layer signal, and $R_h$ indicates the amount of codes allocated to the higher-layer signal.

Figures 1, 2:
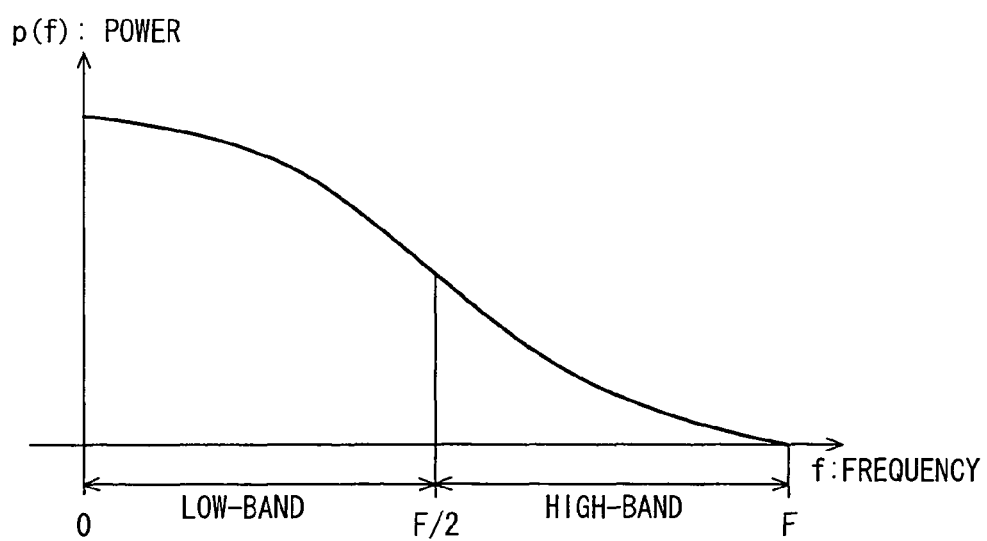
FIG. 1 is a table diagram showing an example of layer setting in the scalable encoding.
FIG. 2 is a graph for showing an example of band splitting with respect to an input signal.

In the first step S10, a target signal to be encoded is input and subjected to a process of decomposing the signal into a lower-layer signal and a higher-layer signal. In this process, a specific decomposition method is designated by an external device. FIG. 2 shows an example of such a method, which is band splitting (a detailed explanation will be provided later).

In the next step S11, the amount of codes allocated to each layer (i.e., the amount $R_l$ of codes allocated to the lower-layer signal and the amount $R_h$ of codes allocated to the higher-layer signal) is obtained as input data. An encoding process applied to the lower-layer signal is executed using specific input data such as the lower-layer signal and the amount $R_l$ of codes allocated to this signal, thereby outputting an encoded stream and an encoding residual signal (i.e., a lower-layer residual signal) with respect to the lower-layer signal (see step S12). In this encoding, a specific encoding method is designated by an external device.

The encoding residual signal is a signal corresponding to the difference between an image signal before encoding (i.e., an original image) and an image signal obtained by decoding the image signal after the encoding.

In the next step S13, a process of computing the value of the (electric) power of the input lower-layer residual signal (i.e., the output of the process of step S12) is performed, thereby outputting the power of the lower-layer residual signal (i.e., a lower-layer residual signal power $A'_l$).

In the next step S14, the following process is applied to specific input data such as a higher-layer signal power $A_h$, the lower-layer residual signal power $A'_l$, and the amount $R_h$ of codes allocated to the higher-layer signal, so as to compute a lower-layer compensation amount $\alpha^*$ of codes.

FIG. 2 shows the electric power characteristic p(f) of a signal with respect to frequency f. An example of decomposing this signal into two different band signals (i.e., a low-band signal and a high-band signal) will be explained. Such band splitting is a method for hierarchically representing a signal; thus, each band is regarded as a layer, and a low-band signal and a high-band signal will be respectively called a lower-layer signal and a higher-layer signal.

Here, $R_l$ indicates the amount of codes allocated to the lower-layer signal, and $R_h$ indicates the amount of codes allocated to the higher-layer signal. Additionally, a lower-layer signal power $A_l$ and the higher-layer signal power $A_h$ are indicated as follows:

$$A_l = \int_0^{F/2} p(f)df$$

$$A_h = \int_{F/2}^{F} p(f)df$$

As discussed above, conventionally, there occurs a problem in that the amount $R_l$ of codes allocated to the lower-layer signal and the amount $R_h$ of codes allocated to the higher-layer signal are each fixed depending on an external condition such as the network, regardless of the type of image.

Therefore, in the present embodiment, when the lower-layer signal has a considerably larger amount of data, part of the amount of codes allocated to the higher-layer signal is allocated to the encoding of the lower-layer signal.

More specifically, a portion ($\alpha$) of the amount $R_h$ of codes allocated to the higher-layer signal is used for encoding an encoding residual (signal) which is generated by encoding the lower-layer signal using the amount $R_l$ of codes. In the following explanation, the encoding residual signal of the lower-layer signal is called the lower-layer residual signal, and the amount $\alpha$ of codes allocated to this residual signal is called a lower-layer compensation amount $\alpha$ of codes.

The method of setting the lower-layer compensation amount $\alpha$ of codes will be explained below. In the explanation, D(a, r) indicates an encoding distortion produced when a signal having a power "a" is encoded using the amount "r" of codes. When the lower-layer signal, the lower-layer residual signal, and the higher-layer signal are respectively encoded using the amounts $R_l$, $\alpha$, and $R_h - \alpha$, a total encoding distortion $J(\alpha)$ is indicated as follows:

$$J(\alpha) = D(D(A_l, R_l), \alpha) + D(A_h, R_h - \alpha) \quad (1)$$

A solution for $\alpha$, which minimizes $J(\alpha)$, is targeted. Regarding the right side of the above formula (1), $D(A_l, R_l)$ does not depend on $\alpha$. When $D(A_l, R_l)$ is represented by A', the formula (1) can be represented as follows:

$$J(\alpha) = D(A'_l, \alpha) + D(A_h, R_h - \alpha) \quad (2)$$

Regarding the two terms on the right side, that is, $D(A'_l, \alpha)$ and $D(A_h, R_h - \alpha)$, the following modeling is possible in accordance with a relationship between the encoding distortion due to a quantization error and the amount of codes (see N. S. Jayant and P. Noll, "Digital coding of waveforms", Prentice Hall, 1984).

$$D(A'_l, \alpha) = \beta^2 A'_l{}^2 2^{-2\alpha} \quad (3)$$

$$D(A_h, R_h - \alpha) = \beta^2 A_h{}^2 2^{-2(R_h - \alpha)} \quad (4)$$

where $\beta$ is a constant determined depending on a distribution of conversion factors. In order to obtain the solution of $\alpha$ for minimizing $J(\alpha)$, the formulas (3) and (4) are incorporated as substitutions into the formula (2), and the solution of α for the following equation is computed.

$$dJ(\alpha)/d\alpha = 0 \quad (5)$$

The solution of this equation (5) is obtained as the following α*:

$$\alpha^* = (\log_2(A'_l/A_h))/4 + R_h/2 \quad (6)$$

Additionally, in order to verify that the computed lower-layer compensation amount α* of codes has a value which can be physically obtained, a process is applied to specific input data such as the lower-layer compensation amount α* of codes and the amount $R_h$ of codes allocated to the higher-layer signal, so as to determine whether the obtained amount α* of codes satisfies the following condition:

$$0 \leq \alpha^* \leq R_h$$

If the above condition is satisfied, a value of true "1" is output and the operation proceeds to step S17. Otherwise, a value of false "0" is output and the operation proceeds to step S16 (see step S15).

In step S16, a clipping process shown by the following formula (7) is applied to specific input data such as the computed lower-layer compensation amount α* of codes, the higher-layer signal power $A_h$, the lower-layer residual signal power $A'_1$, and the amount $R_h$ of codes allocated to the higher-layer signal (α in the formula (7) is α* in this case), thereby outputting an optimum value $\alpha_{opt}$ of α as the final lower-layer compensation amount of codes:

$$\alpha_{opt} = \begin{cases} \frac{1}{4}\log_2\frac{A'_l}{A_h} + \frac{1}{2}R_h & (0 < \alpha < R_h) \\ 0 & (\alpha \leq 0) \\ R_h & (R_h \leq \alpha) \end{cases} \quad (7)$$

In order to simplify the explanation, the present example relates to the frequency-band splitting of a one-dimensional signal; however, a similar concept can be applied to the two-dimensional frequency-band splitting of an intraframe signal, or the three-dimensional frequency-band splitting of a video image signal defined in a temporal space.

In accordance with the above process, when the result of the determination of step S15 is a "1" (true), the value of the right side of the above formula (6) is output as the final lower-layer compensation amount $\alpha_{opt}$ of codes. On the other hand, if the result of the determination of step S15 is "0" (false), then 0 or $R_h$ is output as the final lower-layer compensation amount $\alpha_{opt}$ of codes, depending on the present value of α*.

A process of encoding the lower-layer residual signal is then performed using specific input data such as the above lower-layer compensation amount $\alpha_{opt}$ of codes and the lower-layer residual signal, thereby outputting an encoded stream (see step S17). In this process, a specific encoding method is designated by an external device.

In the next step S18, specific input data such as the lower-layer compensation amount (opt of codes and the amount $R_h$ of codes allocated to the higher-layer signal is subjected to a process of subtracting $\alpha_{opt}$ from $R_h$, thereby outputting the amount $(R_h-\alpha_{opt})$ of codes allocated to the higher-layer signal after the lower-layer compensation.

In the last step S19, the amount $(R_h-\alpha_{opt})$ of codes allocated to the higher-layer signal and the higher-layer signal itself are input so as to encode the higher-layer signal, thereby outputting an encoded stream of the higher-layer signal. In this process, a specific encoding method is designated by an external device.

As described above, the encoding method of each layer is provided from an external device. For example, bit-plane encoding as disclosed in the above Non-Patent Documents 3 or 4 may be used.

Figure 4:
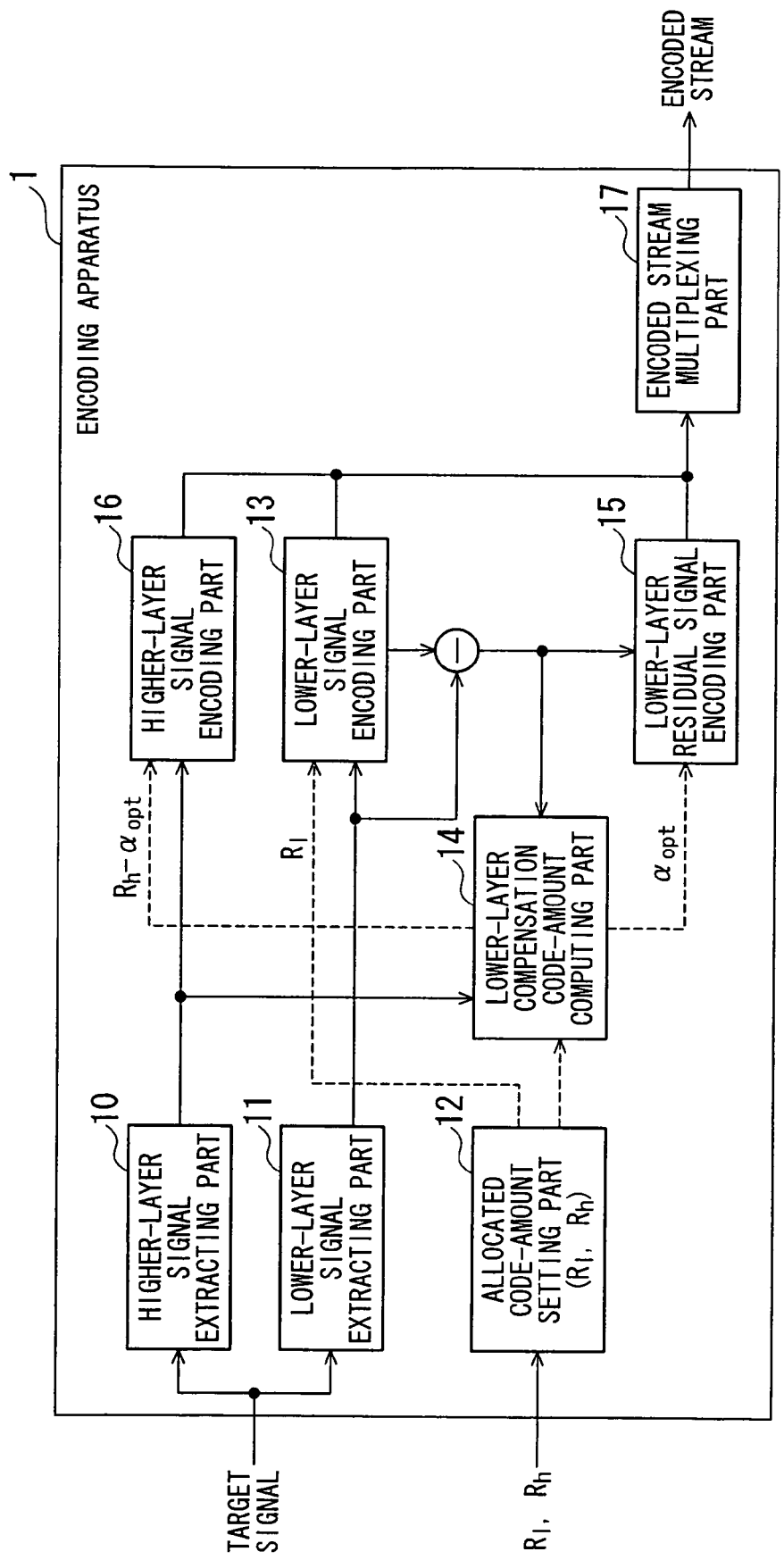
FIG. 4 is a diagram showing an example of the structure of the encoding apparatus in the embodiment.

FIG. 4 is a diagram showing an example of the structure of the encoding apparatus in the present embodiment. The encoding apparatus 1 has a higher-layer signal extracting part 10, a lower-layer signal extracting part 11, an allocated code-amount setting part 12, a lower-layer signal encoding part 13, a lower-layer compensation code-amount computing part 14, a lower-layer residual signal encoding part 15, a higher-layer signal encoding part 16, and an encoded stream multiplexing part 17.

A target signal to be encoded is input into the higher-layer signal extracting part 10 which performs the band splitting of the input signal and outputs a higher-layer signal. The target signal is also input into the lower-layer signal extracting part 11 which performs the band splitting of the input signal and outputs a lower-layer signal. The allocated code-amount setting part 12 sets the amount $R_l$ of codes allocated to the lower-layer signal and the amount $R_h$ of codes allocated to the higher-layer signal, which are designated by an external device in advance.

The lower-layer signal and the amount $R_l$ of codes allocated to this lower-layer signal are input into the lower-layer signal encoding part 13 which performs the encoding so as to output an encoded stream of the lower-layer signal. The higher-layer signal power, the lower-layer residual signal, and the amount $R_h$ of codes allocated to the higher-layer signal are input into the lower-layer compensation code-amount computing part 14 which performs a process corresponding to steps S13 to S16, and S18 in FIG. 3 so as to compute the lower-layer signal power, the lower-layer compensation amount $\alpha_{opt}$ of codes, and the amount $(R_h-\alpha_{opt})$ of codes allocated to the higher-layer signal after the lower-layer compensation. The lower-layer compensation code-amount computing part 14 outputs the computed lower-layer compensation amount $\alpha_{opt}$ of codes to the lower-layer residual signal encoding part 15, and also outputs the amount $(R_h-\alpha_{opt})$ of codes allocated to the higher-layer signal (after the lower-layer compensation) to the higher-layer signal encoding part 16.

The lower-layer residual signal and the lower-layer compensation amount $\alpha_{opt}$ of codes are input into the lower-layer residual signal encoding part 15 which encodes the lower-layer residual signal and outputs the encoded stream of this signal. The higher-layer signal and the amount $(R_h-\alpha_{opt})$ of codes allocated to the higher-layer signal after the lower-layer compensation are input into the higher-layer signal encoding part 16, which then encodes the higher-layer residual signal and outputs the encoded stream of this signal. The encoded stream with respect to the lower-layer signal, the encoded stream with respect to the higher-layer signal, and the encoded stream with respect to the lower-layer residual signal are input into the encoded stream multiplexing part 17 which performs a process of multiplexing the input encoded streams and outputs a multiplexed encoded stream.

The embodiment relating to the encoding performed when the number of layers is 2 has been explained. However, the present invention is not limited to this embodiment, and can be similarly applied to a case in which the target signal is decomposed into three or more layer signals.

Below, a case in which the number of layers is N will be shown. In this case, the signal power, the amount of allocated codes, and the encoding distortion in the n-th layer are respectively represented by $A_n$, $R_n$, and $D_n$. The encoding distortion is defined as "$D_i = \beta A_i^{-2Ri}$" and values of the encoding distortion based on this formula are sorted in descending order, so that part of the amount of codes of a layer having the minimum value (i.e., the first layer) among the sorted values is supplied to a layer having the maximum value (i.e., the h-th layer). Regarding such values sorted for determining the supplier and the receiver in the compensation, the formula "$A_i/R_i$" may be used instead of the above formula. The specific compensation method used in this case is similar to that used in the above 2-layer case. That is, the first layer and the h-th layer can be respectively regarded as the lower layer and the higher layer in the 2-layer case.

In addition, it is also possible to adaptively set the amounts of codes allocated to the encoding residuals with respect to a plurality of layers among the N layers (N≧3), and to redistribute the amounts of codes allocated to each layer so as to encode each layer.

Figure 5:
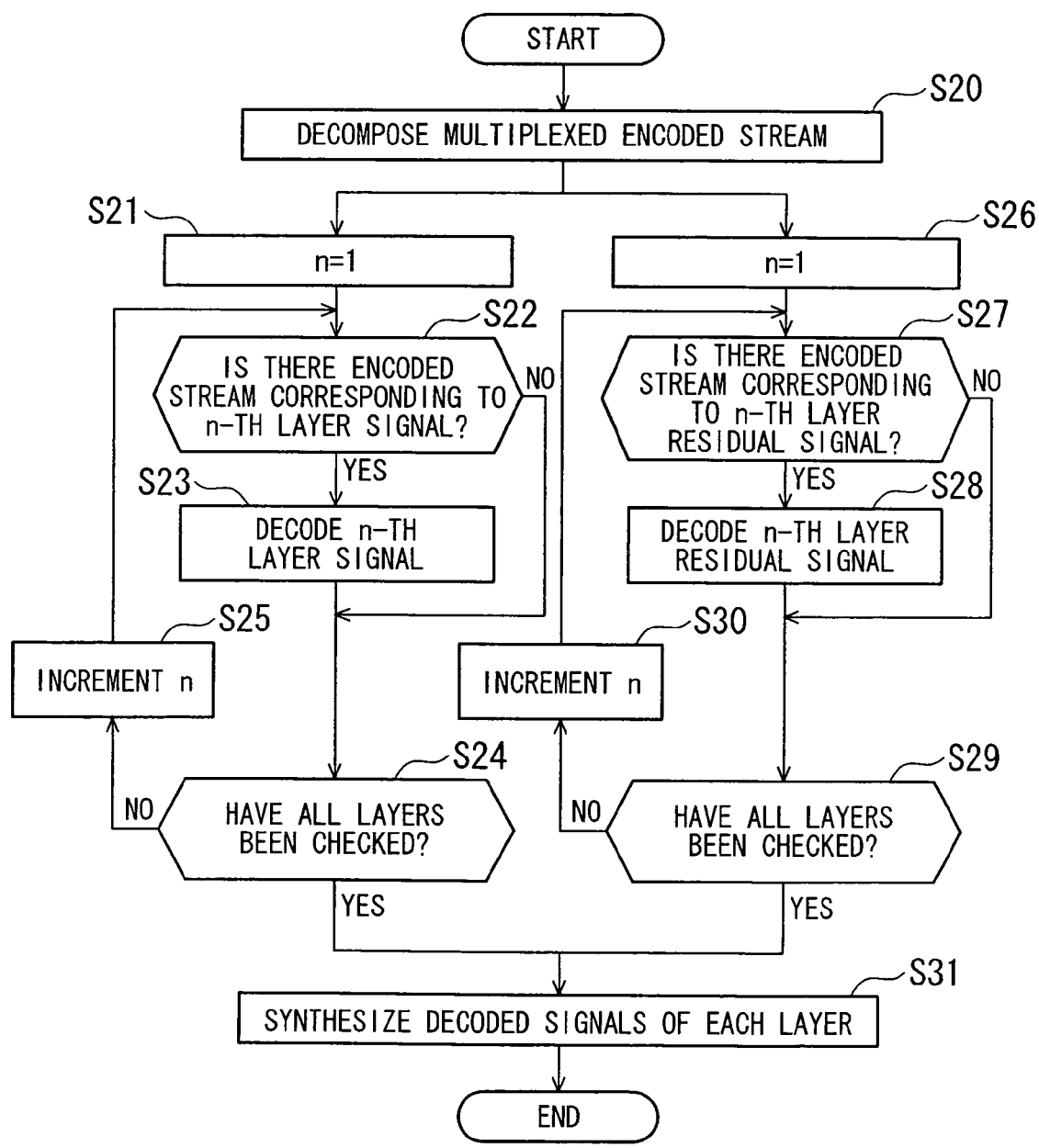
FIG. 5 is a flowchart showing a decoding process in the embodiment.

FIG. 5 is a flowchart showing the decoding process in the present embodiment. An example will be explained in which an image signal is decomposed into two or more layer signals in the encoding apparatus and the obtained encoded stream is received from the encoding apparatus, which is then decoded. Here, the total number of layers is indicated by N (N≧2).

A multiplexed encoded stream is first input and is decomposed into encoded streams for each layer, thereby outputting the encoded stream, an encoding residual stream, and control data for signals of each layer (see step S20).

In the next step S21, a variable n which indicates a target layer to be decoded is initialized (i.e., n=1), and the decoding of the encoded stream of each layer is performed as follows. In step S22, the encoded streams decomposed in step S20 and the control data are input and subjected to a process of determining whether there is an encoded stream corresponding to the n-th layer among the input encoded streams. If the encoded stream corresponding to the n-th layer exists, a "1" (true) is output. Otherwise, a "0" (false) is output. When a "0" is output, no encoding process is performed for the present layer. When a "1" is output, the encoded stream corresponding to the n-th layer signal is input and decoded, thereby outputting a decoded signal of the n-th layer signal (see step S23).

In the next step S24, it is determined whether all layers have been checked. Specifically, the value of the variable n which indicates the target layer for decoding is compared with the total number N of the layers. If n≧N, it is determined that the decoding of all layers has been completed and a "1" is output. Otherwise, a "0" is output. When a "0" is output, a process of adding 1 to the variable n for indicating the target layer is executed (see step S25), and the operation from step S22 is repeated similarly.

In another process starting from step S20, the variable n for indicating the target layer is initialized (i.e., n=1) in step S26, and the decoding of the residual signal of each layer is performed as follows. In step S27, the encoded streams decomposed in step S20 and the control data are input, which are subjected to a process of determining whether there is an encoded stream of the encoding residual signal corresponding to the n-th layer among the input encoded streams. If the encoded stream of the encoding residual signal corresponding to the n-th layer exists, a "1" (true) is output. Otherwise, a "0" (false) is output. When a "0" is output, no process of encoding the encoding residual signal is performed for the present layer. When a "1" is output, the encoded stream of the encoding residual signal corresponding to the n-th layer signal is input and decoded, thereby outputting a decoded signal of the encoding residual signal (see step S28).

In the next step S29, it is determined whether all layers have been checked. Specifically, the value of the variable n which indicates the target layer for the decoding is compared with the total number N of the layers. If n≧N, it is determined that the decoding process with respect to the encoding residual signals of all layers has been completed and a "1" (true) is output. Otherwise, a "0" (false) is output. When a "0" is output, a process of adding 1 to the variable n for indicating the target layer is executed (see step S30), and the operation from step S27 is repeated similarly.

In step S31, the decoded signals of each layer and the decoded signals of the encoding residuals of each layer are input and synthesized, thereby outputting a synthesized decoded signal.

Figure 6:
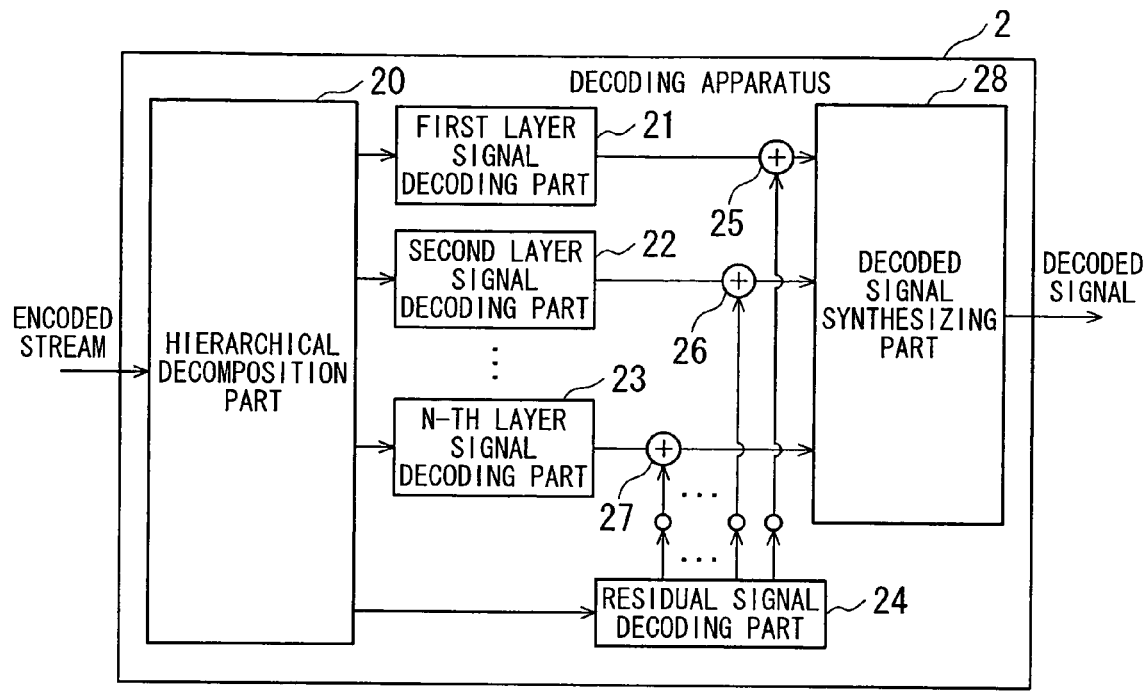
FIG. 6 is a diagram showing an example of the structure of the decoding apparatus in the embodiment.

FIG. 6 is a diagram showing an example of the structure of the decoding apparatus in the present embodiment. The decoding apparatus 2 performs the decoding operation shown in FIG. 5 (in FIG. 6, the case of N=3 or more is shown for easy understanding), and has a hierarchical decomposition part 20, decoding parts 21 to 23 for the first to the Nth layer signals, the residual signal decoding part 24, adders 25 to 27, and a decoded signal synthesizing part 28.

The multiplexed encoded stream is input into the hierarchical decomposition part 20 which decomposes this signal into signals assigned to each layer, thereby outputting the encoded stream of each layer, the encoded stream of the encoding residual of each layer, and the control data for signals of each layer.

When the encoded stream of the first layer exists, the first layer decoding part 21 decodes the received encoded stream and outputs a decoded signal of this stream. When the encoded stream of the second layer exists, the second layer decoding part 22 decodes the received encoded stream and outputs a decoded signal of this stream. Similarly, a decoding part for decoding the encoded stream of each layer is provided, and when the encoded stream of the Nth layer exists, the Nth layer decoding part 23 decodes the received encoded stream and outputs a decoded signal of this stream.

The encoded stream of the encoding residual of each layer and relevant control data are input into the residual signal decoding part 24, which performs decoding so as to output decoded signals respectively corresponding to the encoded streams of the encoding residuals of each layer.

The output from the first to Nth layer signal decoding parts 21 to 23 and the decoded signals (output from the residual signal decoding part 24) of the encoding residuals of the corresponding layers are respectively added to each other by the adders 25 to 27, and added results are output to the decoded signal synthesizing part 28. These decoded signals of each layer, input from the adders 25 to 27 into the decoded signal synthesizing part 28, are subjected to a synthesizing process in the decoded signal synthesizing part 28, and a synthesized signal is output as a final decoded signal.

Instead, the decoded signals of each layer and the decoded signals of the encoding residuals of each layer may be directly input from the first to Nth layer signal decoding parts and the residual signal decoding part 24 to the decoded signal synthesizing part 28, and be synthesized so as to output the synthesized signal as the final decoded signal. In this case, the adders 25 to 27 are unnecessary.

Figure 7:
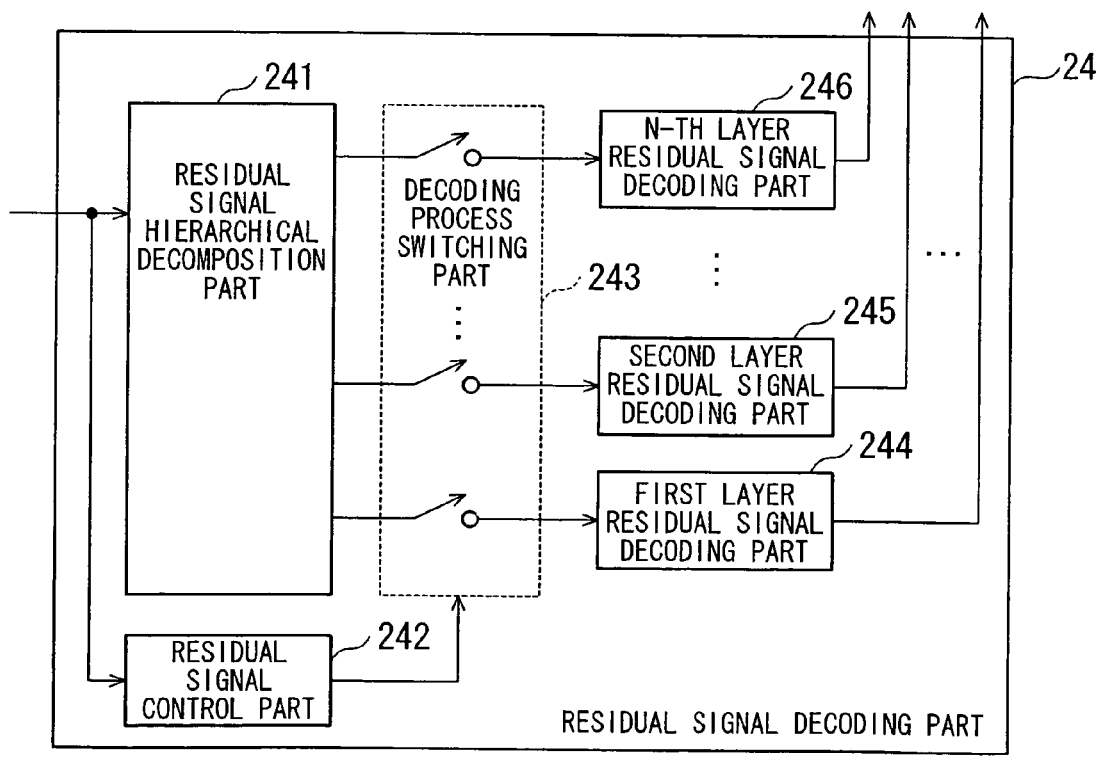
FIG. 7 is a diagram showing an example of the structure of the residual signal decoding part in the decoding apparatus shown in FIG. 6.

FIG. 7 is a diagram showing an example of the structure of the residual signal decoding part 24 shown in FIG. 6. The residual signal decoding part 24 includes a residual signal hierarchical decomposition part 241, a residual signal control part 242, a decoding process switching part 243, and residual signal decoding parts 244 to 246 for the first to Nth layer signals.

The encoded streams of the encoding residuals of each layer are input into the residual signal hierarchical decomposition part 241 so as to separate and respectively output the encoded streams of the encoding residuals of each layer. The control data for each layer signal is input into the residual signal control part 242 which determines the presence or absence of superimposing in the encoding residual signal for each layer, and outputs the result of the determination. This result may be represented by a binary number sequence of N bits.

The result of the determination output from the residual signal control part 242 is input into the decoding process switching part 243. In order to execute the decoding of each layer for which the encoding residual signal is superimposed, the decoding process switching part 243 sends each encoded stream of the encoding residual to be decoded to the corresponding residual signal decoding part. Regarding each layer for which no encoding residual signal is superimposed, the residual signal decoding part of the corresponding layer performs no decoding process. When the encoded stream of the encoding residual of each of the first to Nth layers exists, this encoded stream is input into the corresponding residual signal decoding part among the first to Nth residual signal decoding parts 244 to 246 and is subjected to the decoding process; thus, this corresponding residual signal decoding part outputs a decoded signal corresponding to the encoded stream of the relevant encoding residual signal.

The above-described image signal encoding and decoding processes can be implemented using a computer and software programs. Each program can be stored in and provided by a computer-readable storage medium, or provided via a network.

INDUSTRIAL APPLICABILITY

It is possible to allocate part of the amount of codes allocated to a higher layer to a lower layer in accordance with the amount of data assigned to the lower layer. Therefore, when the total amount of codes is fixed, it is possible to improve the quantity of the decoded image obtained using the total amount of codes.

The invention claimed is:

1. A scalable encoding method for decomposing an image signal into signals assigned to a plurality of layers so as to encode the image signal, the method comprising the steps of:
   encoding an image signal of at least one target layer among the layers based on an amount of codes allocated to the target layer, and outputting a residual signal of the target layer corresponding to a difference between the pre-encoded image signal and an image signal decoded from the encoded image signal;
   determining a target amount of codes allocated for encoding the residual signal based on the residual signal, an amount of codes allocated to an objective layer, and an image signal of the objective layer;
   encoding the residual signal based on the determined target amount of codes; and
   revising the amount of codes allocated to the objective layer based on the target amount of codes and encoding the image signal of the objective layer based on the revised amount of codes, wherein the steps are carried out by the computer.

2. A scalable encoding method in accordance with claim 1, further comprising the step of:
   multiplexing encoded signals of the layers so as to form an encoded stream, wherein:
   the residual signal encoded using the target amount of codes is used as additional data with respect to the already-encoded image signal of the target layer; and
   the encoded signals to be multiplexed include the already-encoded image signal of the target layer, the residual signal encoded based on the target amount of codes, and the image signal of the objective layer which has been encoded based on the revised amount of codes, wherein the steps are carried out by the computer.

3. A scalable encoding method in accordance with claim 1, wherein the step of determining the target amount of codes includes respectively obtaining encoding distortions of the target layer and the objective layer, and determining an amount of codes which minimizes the sum of the obtained encoding distortions as the target amount of codes.

4. A scalable encoding apparatus for decomposing an image signal into signals assigned to a plurality of layers so as to encode the image signal, the apparatus comprising:
   a target layer encoding part, executed by a microprocessor, that encodes an image signal of at least one target layer among the layers based on an amount of codes allocated to the target layer, and outputs a residual signal of the target layer corresponding to a difference between the pre-encoded image signal and an image signal decoded from the encoded image signal;
   a target code-amount determining part, executed by a microprocessor, that determines a target amount of codes allocated for encoding the residual signal based on the residual signal, an amount of codes allocated to an objective layer, and an image signal of the objective layer;
   a residual signal encoding part, executed by a microprocessor, that encodes the residual signal based on the determined target amount of codes; and
   an objective layer encoding part, executed by a microprocessor, that revises the amount of codes allocated to the objective layer based on the target amount of codes and encodes the image signal of the objective layer based on the revised amount of codes.

5. A scalable decoding method for decoding an input encoded stream of an image signal encoded by the scalable encoding method in accordance with claim 1, the decoding method comprising the steps of:
   decomposing the encoded stream into encoded streams of already-encoded layer signals of each layer, encoded streams of already-encoded residual signals corresponding to the layer signals, and control data for the signals of each layer;
   for each of the first to Nth layers, decoding the encoded stream of the already-encoded layer signal when the input encoded stream includes this encoded stream of the already-encoded layer signal;
   for each of the first to Nth layers, decoding the encoded stream of the already-encoded residual signal corresponding to the layer signal when the input encoded stream includes this encoded stream of the already-encoded residual signal; and
   synthesizing the layer signals and the residual signals, which have been decoded for each layer, wherein the steps are carried out by the computer.

6. A scalable decoding apparatus for decoding an input encoded stream of an image signal encoded by the scalable encoding apparatus in accordance with claim 4, the apparatus comprising:

a hierarchical decomposition part, executed by a microprocessor, that decomposes the encoded stream into encoded streams of already-encoded layer signals of each layer, encoded streams of already-encoded residual signals corresponding to the layer signals, and control data for the signals of each layer;

a layer signal decoding part, executed by a microprocessor, that decodes, for each of the first to Nth layers, the encoded stream of the already-encoded layer signal when the input encoded stream includes this encoded stream of the already-encoded layer signal;

a residual signal decoding part, executed by a microprocessor, for each of the first to Nth layers, that decodes the encoded stream of the already-encoded residual signal corresponding to the layer signal when the input encoded stream includes this encoded stream of the already-encoded residual signal; and a decoded signal synthesizing part, executed by a microprocessor, that synthesizes the layer signals and the residual signals, which have been decoded for each layer.

7. A computer-readable storage medium storing a scalable encoding program for making a computer execute a process of decomposing an image signal into signals assigned to a plurality of layers so as to encode the image signal, the program comprising the steps of:

encoding an image signal of at least one target layer among the layers based on an amount of codes allocated to the target layer, and outputting a residual signal of the target layer corresponding to a difference between the pre-encoded image signal and an image signal decoded from the encoded image signal;

determining a target amount of codes allocated for encoding the residual signal based on the residual signal, an amount of codes allocated to an objective layer, and an image signal of the objective layer;

encoding the residual signal based on the determined target amount of codes; and revising the amount of codes allocated to the objective layer based on the target amount of codes and encoding the image signal of the objective layer based on the revised amount of codes.

8. A computer-readable storage medium storing a scalable decoding program for making a computer execute a process of decoding an input encoded stream of an image signal encoded by the scalable encoding method in accordance with claim 1, the decoding method comprising the steps of:

decomposing the encoded stream into encoded streams of already-encoded layer signals of each layer, encoded streams of already-encoded residual signals corresponding to the layer signals, and control data for the signals of each layer;

for each of the first to Nth layers, decoding the encoded stream of the already-encoded layer signal when the input encoded stream includes this encoded stream of the already-encoded layer signal;

for each of the first to Nth layers, decoding the encoded stream of the already-encoded residual signal corresponding to the layer signal when the input encoded stream includes this encoded stream of the already-encoded residual signal; and synthesizing the layer signals and the residual signals, which have been decoded for each layer.

* * * * *